(12) United States Patent
Morooka

(10) Patent No.: US 8,056,595 B2
(45) Date of Patent: Nov. 15, 2011

(54) LOW-PERMEABLE RUBBER LAMINATE AND PNEUMATIC TIRE USING SAME

(75) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 660 days.

(21) Appl. No.: 12/161,157

(22) PCT Filed: Jan. 16, 2007

(86) PCT No.: PCT/JP2007/050866
§ 371 (c)(1),
(2), (4) Date: Jul. 16, 2008

(87) PCT Pub. No.: WO2007/083785
PCT Pub. Date: Jul. 26, 2007

(65) Prior Publication Data
US 2010/0147432 A1  Jun. 17, 2010

(30) Foreign Application Priority Data

Jan. 17, 2006 (JP) .................... 2006-008958
Nov. 16, 2006 (JP) .................... 2006-310540

(51) Int. Cl.
*B60C 1/00* (2006.01)
*B60C 5/00* (2006.01)
*B60C 5/14* (2006.01)

(52) U.S. Cl. .............. 152/511; 152/450; 428/411.1; 428/492

(58) Field of Classification Search .............. 152/450, 152/511; 428/411.1, 492
See application file for complete search history.

(56) References Cited

U.S. PATENT DOCUMENTS

| | | | | |
|---|---|---|---|---|
| 5,040,583 A | * | 8/1991 | Lin et al. .......... | 152/510 |
| 5,851,323 A | * | 12/1998 | Kaido et al. ...... | 152/510 |
| 6,027,814 A | | 2/2000 | Julien et al. | |

FOREIGN PATENT DOCUMENTS

| | | | |
|---|---|---|---|
| CN | 1342725 A | | 4/2002 |
| JP | 62225543 | | 10/1987 |
| JP | 01-314164 | | 12/1989 |
| JP | 08132553 | | 5/1996 |
| JP | 2000136281 | | 5/2000 |
| JP | 2001151972 | | 6/2001 |
| JP | 2002079804 | | 3/2002 |
| JP | 2004176048 | | 6/2004 |
| JP | 2006-008958 | * | 1/2006 |
| JP | 2006-310540 | * | 11/2006 |
| WO | WO-2006059621 | | 6/2006 |

* cited by examiner

*Primary Examiner* — Justin Fischer

(74) *Attorney, Agent, or Firm* — Connolly Bove Lodge & Hutz LLP

(57) ABSTRACT

A low permeability rubber laminate capable of preventing blisters formed when fabricating a pneumatic tire having a low permeability resin composition (A) layer having a air permeation coefficient, determined according to JIS K7126, of $0.5 \times 10^{-12}$ cc·cm/cm²·sec·cmHg or less at 30° C., an average thickness d of $0.05 \, \mu m < d < 5 \, \mu m$ and a Young's modulus E of $0.5 \, \text{MPa} < E < 300 \, \text{MPa}$ at 160-200° C., laminated on one surface of a rubber composition (B) layer and superior in air pressure retention performance and durability and a pneumatic tire using the same as an inner liner.

20 Claims, No Drawings

LOW-PERMEABLE RUBBER LAMINATE AND PNEUMATIC TIRE USING SAME

This application is a national phase of PCT/JP2007/050866, filed Jan. 16, 2007, which claims priority to JP 2006-008958, filed Jan. 17, 2006, and to JP 2006-310540, filed Nov. 16, 2006, the entire contents of all are hereby incorporated by reference.

TECHNICAL FIELD

The present invention relates to a low air permeability rubber laminate and a pneumatic tire using the same, more particularly relates to a low air permeability rubber laminate capable of preventing blistering when fabricating a tire using a low air permeability ethylene vinyl alcohol copolymer (EVOH), as an air permeation preventive layer and superior in air pressure retention performance and durability and a pneumatic tire using the same as an inner liner.

BACKGROUND ART

When using a low air permeability resin as an air permeation preventive layer, laminating the same with rubber, and vulcanizing the laminate, the air contained in the rubber and the gas produced due to the vulcanization reaction cause the increase in the pressure of the gas in the rubber. At this time, if the laminated low permeability resin is low in Young's modulus (i.e., strength), when the pressure is released after vulcanization, a negative pressure is applied to the layer, and therefore blistering occurs and a sufficient gas barrier property cannot be imparted. In particular, this tendency becomes remarkable in a laminate of an air permeation preventive layer composed of a low air permeability resin sandwiched between the rubbers. An ethylene vinyl alcohol copolymer (EVOH) has a superior gas barrier property, and, therefore, can give an air pressure retention performance of at least that of a conventional butyl liner, with a thickness of several μm, but has a low heat resistance (or melting point) of 150 to 195° C. There is the problem that, depending on the vulcanization conditions, the EVOH will be exposed to a temperature near or higher than the melting point to thereby result in the possible destruction of the layer (i.e., blistering).

Japanese Patent Publication (A) No. 2002-79804 discloses the (electron beam) cross-linkable polyvinyl alcohol EVOH. This cross-links the EVOH as a measure against wear of the EVOH and teaches improvement in the heat resistance.

DISCLOSURE OF THE INVENTION

Accordingly, an object of the present invention is to provide a low air permeability rubber laminate capable of preventing the problem of blisters formed at the time of fabricating a tire using a low air permeability ethylene vinyl alcohol copolymer (EVOH) as, for example, an air permeation preventive layer (or an inner liner) and superior in the air pressure retention performance and durability.

In accordance with the present invention, there is provided a low permeability rubber laminate comprising a low permeability resin composition (A) layer having an air permeation coefficient, determined according to JIS K7126, of $0.5 \times 10^{-12}$ cc·cm/cm$^2$·sec·cmHg or less at 30° C., an average thickness d of 0.05 μm<d<20 μm and a Young's modulus E of 0.5 MPa<E<300 MPa at 200° C. and rubber composition (B) layer, laminated together.

In accordance with the present invention, there is provided a low permeability rubber laminate comprising a low permeability resin composition (A) layer having an air permeation coefficient, determined according to JIS K7126, of $0.5 \times 10^{-12}$ cc·cm/cm$^2$·sec·cmHg or less at 30° C., an average thickness d of 0.05 μm<d<20 μm and a Young's modulus E of 0.5 MPa<E<300 MPa at 200° C., sandwiched between the two rubber composition (B) layers.

In accordance with the present invention, there is provided a pneumatic tire using the laminate as the inner liner.

Effects of the Invention

A low permeability rubber laminate comprising a layer of a low permeability resin composition (A) having an air permeation coefficient of $0.5 \times 10^{-12}$ cc·cm/cm$^2$·sec·cmHg or less, an average thickness d of 0.05 μm<d<20 μm, and a Young's modulus E of 0.5 MPa<E<300 MPa at 200° C. and a layer of a rubber composition (B) laminated together according to the present invention can effectively prevent blistering at the time of tire fabrication and further is superior in air pressure retention performance and durability.

BEST MODE FOR CARRYING OUT THE INVENTION

The inventors engaged in research to solve the above problem, that is, the problem that when laminating a low permeability resin (e.g., EVOH) as an air permeation preventive layer with rubber and vulcanizing the laminate, the air contained in the rubber and the gas produced due to the vulcanization reaction cause the increase in the pressure of the gas in the rubber and blistering to occur due to the negative pressure at the time of releasing the pressure after vulcanization, therefore the inability to impart a sufficient gas permeation preventive property and, as a result, discovered that by using a layer having the low permeability resin composition (A) with an air permeation coefficient at room temperature (30° C.) of $0.5 \times 10^{-12}$ cc·cm/cm$^2$·sec·cmHg or less and a Young's modulus E at 200° C. of 0.5 MPa<E<300 MPa, it is possible to effectively suppress the problem of blistering and, further, that by making the average thickness d of the low permeability resin composition (A) layer 0.05 μm<d<20 μm, it is possible to achieve both an air pressure retention performance and durability.

The layer of the low permeability resin composition (A) according to the present invention must have an air permeation coefficient, determined according to JIS K7126 at 30° C., of $0.5 \times 10^{-12}$ cc·cm/cm$^2$·sec·cmHg or less, preferably $0.1 \times 10^{-12}$ cc·cm/cm$^2$·sec·cmHg or less, an average thickness d of 0.05 μm<d<20 μm, preferably 1 to 3 μm, and a Young's modulus E at 160 to 200° C., determined according to JIS K6251, of 0.5 MPa<E<300 MPa, preferably 1 MPa<E<300 MPa. If this layer had a larger air permeation coefficient, the desired low air permeability would not be obtained, and, therefore, the air pressure retention performance would not be sufficient. If the Young's modulus is smaller, the blistering at the time of release of the pressure could not be suppressed, and, therefore, this would not be preferred. If the average thickness d is thinner, the desired air pressure retention performance could not be imparted, and, therefore, this would not be preferred. Conversely, if thicker, the stretching and bending fatigue resistance would be inferior, and, therefore, this would not be preferred.

The low permeability resin composition (A) forming the layer of the low permeability rubber laminate according to the present invention can be made any thermoplastic resin composition satisfying this requirement, but preferably, as the resin composition, the low permeability resin composition is preferably comprised of (i) an ethylene vinyl alcohol copolymer (D) having an ethylene ratio of 20 to 50 mol %, more preferably 20 to 40 mol %, and having a saponification degree of 90% or more, more preferably 95% or more, in an amount of 100 parts by weight, and (ii) an aliphatic polyamide resin (E) having a melting temperature, found from an endothermic peak of a DSC (differential scan calorimeter) (measurement under conditions of a temperature increasing rate 10° C./min) higher than 200° C., more preferably 200 to 225° C., in an amount of 10 to 100 parts by weight, more preferably 20 to 100 parts by weight.

The ethylene vinyl alcohol copolymer (D) usable in the present invention having a saponification degree of 90% or more is a known copolymer. For example, it may be produced by hydrolyzing (or saponifying) an ethylene-vinyl acetate copolymer (EVA) obtained by a radical polymerization of ethylene and vinyl acetate. In the present invention, Eval L171B (ethylene ratio of 26 mol %, made by Kuraray), Eval H171B (ethylene ratio of 38 mol %, made by Kuraray), or other commercially available products, may be used alone or in any mixtures thereof.

The aliphatic polyamide resin (E) usable in the present invention is a known resin. For example, Nylon 6, Nylon 66, Nylon 6.66, Nylon 6.10, Nylon 6.12 or another Nylon can be used alone or in any mixtures thereof. Various commercially available products may be used.

The low permeability resin composition (A) according to the present invention is preferably obtained by melt kneading 100 parts by weight of the EVOH (D) and 10 to 100 parts by weight, preferably 20 to 100 parts by weight, of an aliphatic polyamide resin (E) by a twin-screw extruder, single-screw extruder, etc. A composition comprising a continuous layer of EVOH (D), in which an aliphatic polyamide resin (E) is dispersed, as a dispersed phase, is preferable.

According to another aspect of the present invention, another aspect of the low permeability resin composition (A) forming the phase of the laminate includes (i) 100 parts by weight of an ethylene vinyl alcohol copolymer (D) having an ethylene ratio of 20 to 50 mol %, preferably 20 to 40 mol % and a saponification degree of 90% or more, preferably 95% or more, (ii) 10 to 100 parts by weight, preferably 20 to 100 parts by weight, of an aliphatic polyamide resin (E) having a melting temperature found from an endothermic peak of DSC (i.e., differential scan calorimeter), determined under conditions of a temperature increase rate of 10° C./min) of higher than 200° C., more preferably 200 to 225° C., and (iii) 5 to 100 parts by weight, preferably 50 to 100 parts by weight, based upon 100 parts by weight of the total weight of the ethylene vinyl alcohol copolymer (D) and aliphatic polyamide resin (E), of a modified ethylene-based copolymer (F), and further having a phase structure having the modified ethylene-based copolymer (F), as a dispersed particle phase. The ethylene vinyl alcohol copolymer is known, as explained above. A commercially available product may also be used. The aliphatic polyamide resin is known, as explained above. A commercially available product may also be used.

The low permeability resin composition (A) according to the second aspect of the present invention contains, in addition to the EVOH (D) and the aliphatic polyamide resin (E), the modified ethylene-based copolymer (F) in an amount of 5 to 100 parts by weight, based upon 100 parts by weight of the total weight of (D) and (E). Due to this, the bondability in the case laminated with a rubber composition is improved. In particular, if the rubber ingredient in the rubber composition is a halogenated butyl rubber, the effect of improvement becomes larger. If the amount blended is small, the effect of improvement in the bondability with the rubber composition is small, while conversely if large, the modified ethylene-based copolymer (F) forms a continuous phase and the gas barrier property is liable to be deteriorated, and, therefore, the 200° C. Young's modulus E becomes less than 0.5 MPa and blistering is liable to occur at the time of vulcanization, and, therefore, this is not preferred.

The modified ethylene-based copolymer (F) usable in the present invention is, for example, an ethylene-propylene copolymer, ethylene-butene copolymer ethylene-hexene copolymer, ethylene-octene copolymer or other ethylene-α-olefin copolymer modified, by an ordinary method, with anhydrous maleic acid or another acid anhydride. In the present invention, it is possible to use the commercially available product of Tuffmar MP-0620 (anhydrous maleic acid modified ethylene-propylene copolymer made by Mitsui Chemical, modification rate: 1.5% by weight) alone or in any mixtures thereof.

The low permeability resin composition (A) usable in the present invention may include, in addition to the above resin ingredient, an antioxidant, antiaging agent, coloring agent, plasticizer, filler, processing aid or various other additives generally used for resin composition. These additives are mixed with the resin to form a composition by a general method and can be used for lamination. The amounts of these additives added can be made the amounts generally used in the past so long as the object of the present invention is not adversely affected.

The rubber ingredient in the rubber composition forming the layer (B) of the laminate according to the present invention may be composed of at least one member selected from diene-based rubbers, for example, natural rubber (NR), isoprene rubber (IR), butadiene rubber (BR), halogenated butyl rubber (e.g., brominated butyl rubber (Br-IIR), chlorinated butyl rubber (Cl-IIR)), ethylene-propylene copolymer rubber (EPDM) and styrene-based elastomer (e.g., styrene-butadiene rubber (SBR), styrene-butadiene-styrene block copolymer (SBS)), etc. A halogenated butyl rubber is particularly preferable.

The rubber composition forming the layer (B) of the laminate according to the present invention may contain, in addition to the above rubber ingredients, carbon black, silica or another filler, a vulcanization or cross-linking agent, vulcanization or cross-linking accelerator, various types of oils, an autooxidant, plasticizer or various other types of additives generally added for tire or other rubber composition use. These additives can be kneaded by a general method to form a composition for use for vulcanization or cross-linking. The addition amounts of these additives can be made the amounts generally added in the past so long as the object of the present invention is adversely affected.

The low permeability rubber laminate according to a preferred aspect of the present invention is provided with an adhesive (C) layer between the low permeability resin composition (A) layer and the rubber composition (B) layer. As the adhesive forming the adhesive (C) layer, it is possible to use any adhesive capable of being used for bonding the resin composition and the rubber composition. As such an adhesive, for example, a modified styrene copolymer is exemplified. Specifically, any adhesive used in the past for a polyamide-based thermoplastic elastomer comprised of a styrene-ethylene-propylene copolymer, styrene-ethylene-butadiene-styrene copolymer, styrene-ethylene-butadiene copolymer or styrene-butadiene-styrene copolymer having an epoxy group, hydroxyl group, amino group, carboxyl group, acid anhydride group or other functional groups and a vulcanization accelerator, vulcanizer, and tackifier (see Japanese Patent Publication (A) No. 2005-68173 and Japanese Patent Publication (A) No. 2005-212452) may be mentioned. The method and amount of use may be conventional.

EXAMPLES

The present invention will non be further explained using Examples, but the scope of the present invention is by no means limited to these Examples.

The material (D) and material (E) used in the following Examples are shown in Table I, the composition of the low permeability resin forming (A) comprised of these is shown in Table II, and the formulation of the adhesive forming the adhesive layer (C) is shown in Table III. Table IV shows the formulation of the rubber composition (B) used.

TABLE I

Materials (D) and (E)

| Name of material | Name of product | Name of manufacturer | Air permeation coefficient ($\times 10^{-12}$ cc · cm/cm$^2$ · s · cmHg) | Melting temperature*[2] (° C.) |
|---|---|---|---|---|
| EVOH resin (D) | | | | |
| EVOH (ethylene-vinyl alcohol copolymer) | Eval L171B | Kuraray | 0.01 | 191 |
| EVOH (ethylene-vinyl alcohol copolymer) | Soarnol V2603RB | Nippon Gohsei | 0.006 | 195 |
| Aliphatic polyamide resin (E) | | | | |
| PA11*[1] (Nylon 11) | Rilsan BESNO TL | Arkema | 10 | 186 |
| PA6 (Nylon 6) | UBE Nylon 1030B | Ube Industries | 1.4 | 217 |

*[1]Comparative Example

*[2]The melting temperature was made the temperature of the endothermic peak of melting determined by a differential scan calorimeter (DSC) at a temperature increasing rate of 10° C./min.

TABLE II

Low Permeability Resin Composition (A)

| | Type of polymer | A1 | A2 | A3 | A4 | A5 | A6 | A7 |
|---|---|---|---|---|---|---|---|---|
| Formulation (parts by weight) EVOH resin (D) | | | | | | | | |
| L171B*[1] | EVOH (27 mol %) | 100 | — | 100 | 100 | — | — | 100 |
| V2603B*[2] | EVOH (26 mol %) | — | 100 | — | — | 100 | 100 | — |
| Aliphatic polyamide resin (E) | | | | | | | | |
| 1030B*[3] | PA6 | — | — | 25 | 67 | 25 | 67 | — |
| BESNOTL*[4] | PA11 | — | — | — | — | — | — | 25 |
| Physical properties | | | | | | | | |
| Air permeation coefficient (cc · cm/cm$^2$ · s · cmHg) | | 0.01 | 0.006 | 0.02 | 0.08 | 0.01 | 0.06 | Film formation not possible, so not measured |
| 200° C. Young's modulus (MPa) | | <0.1 | <0.1 | 2 | 5.2 | 2.5 | 6.2 | <0.1 |

*[1]Eval L171B made by Kuraray
*[2]Soarnol V2603B made by Nippon Gohsei
*[3]UBE Nylon 1030B made by Ube Industries
*[4]Rilsan BESNOTL made by Arkema

TABLE III

Formulation of Adhesive

| Name of material | (Parts by weight) |
|---|---|
| ESBS[1] | 100 |
| Tackifier[2] | 30 |
| Stearic acid[3] | 1 |
| Peroxide[4] | 2 |
| Zinc White[5] | 0.5 |
| Total (phr) | 133 |

[1]Epofriend AT501 made by Daicel Chemical Industries
[2]YS Resin made by Yasuhara Chemical
[3]Beads Stearic Acid YR made by NOF Corporation
[4]Percumyl D-40 made by NOF Corporation
[5]Zinc White No. 3 made by Seido Chemical Industry

TABLE IV

Formulation of Rubber Composition (B)

| Formulation (parts by weight) | G-01 |
|---|---|
| NR[1] | 50 |
| SBR[2] | 50 |
| CB[3] | 55 |
| CZ[4] | 2 |
| Stearic acid[5] | 1 |
| Zinc White[6] | 5 |
| Sulfur[7] | 2 |

[1]SIR20 made by PT. Nusira
[2]Nipol 1502 made by Nippon Zeon
[3]Niteron GN made by Nippon Steel Chemical Carbon
[4]Noccelar CZ made by Ouchi Shinko Chemical Industrial
[5]Beads Stearic Acid YR made by NOF Corporation
[6]Zinc White No. 3 made by Seido Chemical Industry
[7]Oil-treated sulfur made by Karuizawa Refinery Examples 1 to 4 and Comparative Examples 1 to 4

A three-layer die type T-die molding machine was used to prepare a three-layer laminate film of a thermoplastic resin (Novatec LD LF128) made by Japan Polyethylene/low permeability resin composition A1 to A9 (see Table II)/adhesive (see Table III). Next, a calendar roll was used to laminate a rubber composition (see Table IV) sheet and the laminate film in the order of a thermoplastic resin/low permeability resin composition/adhesive/rubber composition, a pressure of 0.5 kg/cm² or more was applied to press-bond the adhesive/rubber composition, then the thermoplastic resin was peeled off so as to obtain a laminate composed of three layers of a low permeability resin composition/adhesive/rubber composition. Next, an adhesive solution of the adhesive dissolved in toluene (10% by weight toluene solution) was coated on the low permeability resin composition side and dried, then the calendar roll was again used to bond the rubber composition, whereby a low permeability rubber laminate comprising a low permeability resin composition composed of rubber composition/adhesive/low permeability resin composition/adhesive/rubber composition, sandwiched between rubber compositions was prepared. Next, this low permeability rubber laminate was used, as the inner liner, to prepare a tire (195/65R14) at a vulcanization temperature of 190° C. The inner surface was observed (check of outer appearance), an indoor tire running test was run, and the air leakage was evaluated by the following methods. The results are shown in Table V.

Method of Measurement of Air Permeation Coefficient of Film (Air Permeability Test Method)

Determined according to JIS K7126 "Air Permeability Test Methods of Plastic Film and Sheets". The test is conducted by a method measuring the permeability of all sorts of gases not in the range of use of the test apparatus used, that is, the Method A (i.e., differential pressure method) of holding one side partitioned off by a test piece (i.e., low pressure side) at a vacuum, introducing the test gas to the other side (i.e., high pressure side), and using the increase in pressure at the low pressure side to determine the gas permeability. Here, the gas permeation coefficient was calculated from the gas permeability found.

Test piece: Film prepared by Kuraray used

Test gas: Air ($N_2:O_2=8:2$)

Test temperature: 30° C.

200° C. Young's Modulus

200° C. Young's modulus determined according to JIS K6251. "Tensile Test Method of Vulcanized Rubber". The test piece was obtained by punching a film sample prepared by extrusion into a JIS No. 3 dumbbell shape in parallel with the direction of flow of the resin at the time of extrusion. A tangent was drawn to the curve of the initial strain region of the stress-strain curve obtained and the Young's modulus was found from the slant of that tangent.

Observation of Inside Surface

After the tire fabrication, the inner surface of the tire was visually observed to confirm for the formation of any blisters. Tires where blisters occurred were evaluated as "Poor", while tires where no blisters occurred were evaluated as "Good".

Judgment of Durability

The fabricated tires were inflated to an air pressure of 200 kPa, attached to a 1500 cc class passenger car given a load equivalent to four passengers (65 kg/person), and run on an actual road for 20,000 km. After running, the tires were detached from the rims and the inner surfaces of the tires were visually observed. Tires where cracks or peeling (i.e., blistering of rubber composition layer) occurred at the inner surface were evaluated as "Poor", while tires where no cracks or peeling occurred were evaluated as "Good".

Measurement of Air Leakage

A tire was adjusted to a relative humidity of 50% RH and an initial pressure of 200 kPa, then allowed to stand under no-load conditions at a room temperature of 21° C. for three months. The pressure was measured at measurement intervals of every four days. The following function $$P_t/P_0 = \exp(-\alpha t)$$

was regressed to find the α-value, where the measurement pressure is $P_t$, the initial pressure is $P_0$, and number of elapsed days is t. The α thus obtained was used and t=30 was entered into the following equation $$\beta = [1-\exp(-\alpha t)] \times 100$$

to obtain the β-value. This value was used as the rate of pressure drop per month (air leakage rate) (%/month).

TABLE V

Evaluation of Inner Liner

| | Comp. Ex. 1 | Comp. Ex. 2 | Comp. Ex. 3 | Ex. 1 | Ex. 2 | Ex. 3 | Ex. 4 | Comp. Ex. 4 |
|---|---|---|---|---|---|---|---|---|
| (A) | A1 | A2 | A3 | A3 | A4 | A5 | A6 | A7 |
| (A) layer gauge (μm) | 2 | 2 | 25 | 2 | 4 | 2 | 4 | Formation not possible, so not workable |
| 200° C. Young's modulus (MPa) | <0.1 | <0.1 | 2 | 2 | 5.2 | 2.5 | 6.2 | |
| Observation of inner surface | Poor | Poor | Good | Good | Good | Good | Good | — |
| Judgment of durability | Poor Cracks and peeling from BL part | Poor Cracks and peeling from BL part | Poor Peeling between (A) and rubber composition | Good | Good | Good | Good | — |
| Air leakage measurement value (%/month) | 0.6 | 0.5 | 0.5 | 0.7 | 0.8 | 0.6 | 0.7 | — |

In Comparative Examples 1 and 2, the low permeability resin composition (A) did not satisfy the prescribed Young's modulus at 200° C., and, therefore, after vulcanization, a large number of blisters formed from the EVOH layer. Further, after the durability test, the cracks and peeling occurred in the rubber composition layer from the blister parts. In Comparative Example 3, the low permeability resin composition (A) satisfied the prescribed Young's modulus, and, therefore, blisters did not form, but the (A) layer gauge was thick, and, therefore, after the durability test, peeling was seen between the (A) layer and rubber composition layer.

On the other hand, in Examples 1 to 4, the low permeability resin composition (A) satisfied the prescribed Young's modulus and the (A) layer gauge was also within the prescribed numerical value, and, therefore, even after the durability test, no cracks or peeling occurred in the rubber composition layer.

However, in Comparative Example 4, Nylon 11 was used for the aliphatic polyamide resin, but this was poor in compatibility with an ethylene vinyl alcohol copolymer, and, therefore, no film could be formed.

Examples 5 to 7 and Comparative Examples 5 to 6

A two-layer die type T-die molding machine was used to prepare a two-layer laminate film of a thermoplastic resin (i.e., Novatec LD LF128 made by Japan Polyethylene)/low permeability resin composition A8 to A12 (see Table VII). Next, a calendar roll was used to laminate a halogenated rubber composition (see Table VI) sheet and laminate film in the order of the thermoplastic resin/the low permeability resin composition/the rubber composition, pressure was applied to 0.5 kg/cm² or more to press bond the low permeability resin composition/rubber composition, then the thermoplastic resin was peeled off to obtain a laminate composed of two layers of a low permeability resin composition/the rubber composition. Next, the calendar roll was again used to bond the halogenated butyl composition to fabricate a low permeability rubber laminate composed of a low permeability resin composition made of a halogenated butyl composition/low permeability resin composition/halogenated butyl composition, sandwiched between the halogenated butyl composition. Next, this low permeability rubber laminate was used, as the inner liner for fabrication of a tire (195/65R14) at a vulcanization temperature of 190° C. The inner surface was observed (i.e., check of outer appearance), the durability was judged (i.e., indoor tire running test) and the air leakage was evaluated by the following methods. The results are shown in Table VIII.

Morphology

A transmission type electron microscope (TEM) was used to observe the morphologies of the low permeability resin compositions (A) shown in Examples 5 to 7 and Comparative Examples 5 to 6. The dispersed state of the modified ethylene-based copolymer was confirmed by giving contrast by using ruthenium tetraoxide ($RuO_4$) to selectively dye a modified ethylene-based copolymer.

200° C. Young's Modulus

200° C. Young's modulus measured according to JIS K6251 "Tensile Test Method of Vulcanized Rubber". The test piece was obtained by punching a film sample prepared by extrusion into a JIS No. 3 dumbbell shape in parallel with the direction of flow of the resin at the time of extrusion. A tangent was drawn to the curve of the initial strain region of the obtained stress-strain curve and the Young's modulus was found from the slant of that tangent.

Observation of Inner Surface

After fabrication of a tire, the inner surface of the tire was visually examined to confirm if any blisters formed. Tires where blisters formed were evaluated as "Poor", while those where no blisters formed were evaluated as "Good".

Measurement of Air Leakage (1)

A tire was adjusted to a relative humidity of 50% RH and an initial pressure of 200 kPa, then allowed to stand under no-load conditions at a room temperature of 21° C. for three months. The pressure was measured at measurement intervals of every four days. The following function $$P_t/P_0 = \exp(-\alpha t)$$

was regressed to find the α-value, where the measurement pressure is $P_t$, the initial pressure is $P_0$, and number of elapsed days is t. The α thus obtained was used and t=30 was entered into the following equation $$\beta = [1 - \exp(-\alpha t)] \times 100$$

to obtain the β-value. This value was used as the rate of pressure drop per month (i.e., air leakage rate) (%/month).

Measurement of Air Leakage (2)

A tire was adjusted to a relative humidity of 90% RH and an initial pressure of 200 kPa, then allowed to stand under no-load conditions at a room temperature of 21° C. for three months. The pressure was measured at measurement intervals of every four days. The following function $$P_t/P_0 = \exp(-\alpha t)$$

was regressed to find the α-value, where the measurement pressure is $P_t$, the initial pressure is $P_0$, and number of elapsed days is t. The α thus obtained was used and t=30 was entered into the following equation $$\beta = [1 - \exp(-\alpha t)] \times 100$$

to obtain the β-value. This value was used, as the rate of pressure drop per month (i.e., air leakage rate) (%/month).

Judgment of Durability

The fabricated tires were inflated to an air pressure of 200 kPa, attached to a 1500 cc class passenger car given a load equivalent to four passengers (65 kg/person), and run on an actual road for 20,000 km. After running, the tires were detached from the rims and the inner surfaces of the tires were visually observed. Tires where cracks or peeling (i.e., blistering of rubber composition layer) occurred at the inner surface were evaluated as "Poor", while tires where no cracks or peeling occurred were evaluated as "Good".

TABLE VI

Formulation of Butyl Rubber

| Name of material | (Parts by weight) |
| --- | --- |
| Br-IIR[#1] | 100 |
| GPF carbon black[#2] | 60 |
| Stearic acid[#3] | 1 |
| Noccelar DM[#4] | 1.3 |
| Zinc oxide[#5] | 3 |
| Sulfur[#6] | 0.5 |
| Total (phr) | 133 |

[#1]Exxon Bromobutyl 2255 made by Exxon Chemical
[#2]Diablack G made by Mitsubishi Chemical
[#3]Beads Stearic Acid YR made by NOF Corporation
[#4]Noccelar DM made by Ouchi Shinko Chemical Industrial
[#5]Zinc White No. 3 made by Seido Chemical Industry
[#6]Oil-treated sulfur made by Karuizawa Refinery

TABLE VII

| Low Permeability Resin Composition (A) | | | | | | |
| --- | --- | --- | --- | --- | --- | --- |
| | Type of polymer | A8 | A9 | A10 | A11 | A12 |
| Formulation (parts by weight) | | | | | | |
| EVOH resin (D) | | | | | | |
| L171B | EVOH (27 mol %) | 100 | 100 | — | — | 100 |
| V2603B | EVOH (26 mol %) | — | — | 100 | 100 | — |
| Aliphatic polyamide resin (E) | | | | | | |
| 1030B | PA6 | — | 40 | 25 | 25 | — |
| BESNOTL | PA11 | — | — | — | — | 40 |
| Modified ethylene-based copolymer (F) | | | | | | |
| MP-0620*[1] | Mah-EP | — | 95 | 80 | 30 | 95 |
| Physical properties | | | | | | |
| Air permeation coefficient (cc · cm/cm$^2$ · s · cmHg) | | 0.01 | 0.09 | 0.07 | 0.04 | 0.1 |
| 200° C. Young's modulus (MPa) | | <0.1 | 2.85 | 1.35 | 1.45 | <0.1 |

*[1]Tuffmar MP-0620 made by Mitsui Chemical (i.e., maleic acid modified ethylene-propylene rubber)

TABLE VIII

| | Evaluation of Inner Liner | | | | |
| --- | --- | --- | --- | --- | --- |
| | Comp. Ex. 5 | Ex. 5 | Ex. 6 | Ex. 7 | Comp. Ex. 6 |
| (A) | A8 | A9 | A10 | A11 | A12 |
| (A) layer gauge (μm) | 3 | 6 | 6 | 4 | 6 |
| Morphology | — | MP-0620 forms dispersed particle phase | MP-0620 forms dispersed particle phase | MP-0620 forms dispersed particle phase | MP-0620 forms dispersed particle phase |
| 200° C. Young's modulus (MPa) | <0.1 | 2.85 | 1.35 | 1.45 | <0.1 |
| Observation of inner surface | Poor | Good | Good | Good | Poor |
| Durability test | Poor Peeling between (A)/(B) | Good | Good | Good | Poor Cracks and peeling formed from blister parts |
| Air leakage measurement value (1) (%/month) | 0.6 | 1.2 | 1 | 0.8 | 1.2 |
| Air leakage measurement value (2) (%/month) | 0.6 | 1.2 | 1 | 0.8 | 1.3 |

In Comparative Example 5, at 200° C., the low permeability resin composition (A) did not satisfy the prescribed Young's modulus, and, therefore, after vulcanization, a large number of blisters were formed from the (A) layer. Further, the bondability with the butyl rubber composition was poor, and, therefore, after the durability test, peeling was observed between the butyl rubber composition/(A) layer from outside the blister parts as well.

On the other hand, Examples 5 to 7 satisfied the prescribed modulus of elasticity and formed structures with the modified ethylene-based copolymer (MP-0620) dispersed as dispersion particles in an EVOH matrix phase, and, therefore, no blisters were formed and, even after the durability test, no peeling occurred between the butyl rubber composition/(A) layer.

However, in Comparative Example 6, the formulated aliphatic polyamide resin was Nylon 11 (melting temperature: 186° C.), and, therefore, at 200° C. the low permeability resin composition (A) did not satisfy the prescribed Young's modulus. After vulcanization, a large number of blisters were formed from the (A) layer. After the durability test, cracks and peeling were observed from the blister parts.

INDUSTRIAL APPLICABILITY

The laminate according to the present invention is low in the permeability, and, therefore, it may be used as the inner liner of a pneumatic tire and can reduce the weight of the tire and achieve a high air pressure retention performance.

The invention claimed is:

1. A low permeability rubber laminate comprising a low permeability resin composition (A) layer having an air permeation coefficient, determined according to JIS K7126, of $0.5 \times 10^{-12}$ cc·cm/cm$^2$·sec·cmHg or less at 30° C., an average thickness d of 0.05 μm<d<20 μm and a Young's modulus E of 0.5 MPa<E<300 MPa at 200° C. and a rubber composition (B) layer, laminated together, wherein the low permeability resin composition (A) comprises (i) 100 parts by weight of an ethylene vinyl alcohol copolymer (D) having an ethylene composition ratio of 20 to 50 mol % and a saponification degree of 90% or more, (ii) 10 to 100 parts by weight of an aliphatic polyamide resin (E) having a melting temperature, found from an endothermic peak of a differential scan calorimeter (DSC), of higher than 200° C. and (iii) 5 to 100 parts by weight, based upon 100 parts by weight of the total amount of the ethylene vinyl alcohol copolymer (D) and polyamide resin (E), of a modified ethylene-based copolymer (F) and has a phase structure containing the modified ethylene-based copolymer (F) as a dispersed particle phase.

2. A low permeability rubber laminate as claimed in claim 1, wherein said modified ethylene-based copolymer (F) has an acid anhydride group.

3. A low permeability rubber laminate as claimed in claim 2, wherein said aliphatic polyamide resin (E) is at least one resin selected from Nylon 6, Nylon 66, Nylon 6.66, Nylon 6.10 and Nylon 6.12.

4. A low permeability rubber laminate as claimed in claim 2, wherein a rubber ingredient in the rubber composition (B) is at least one member selected from diene-based rubbers, halogenated butyl rubbers, ethylene-propylene-diene copolymer rubbers and styrene-based elastomers.

5. A low permeability rubber laminate as claimed in claim 2, wherein an adhesive (C) layer is placed between the low permeability resin composition (A) layer and the rubber composition (B) layer.

6. A pneumatic tire using a low permeability rubber laminate according to claim 2.

7. A pneumatic tire using a low permeability rubber laminate according to claim 2, as an inner liner.

8. A low permeability rubber laminate as claimed in claim 1, wherein said aliphatic polyamide resin (E) is at least one resin selected from Nylon 6, Nylon 66, Nylon 6.66, Nylon 6.10 and Nylon 6.12.

9. A low permeability rubber laminate as claimed in claim 8, wherein a rubber ingredient in the rubber composition (B) is at least one member selected from diene-based rubbers, halogenated butyl rubbers, ethylene-propylene-diene copolymer rubbers and styrene-based elastomers.

10. A low permeability rubber laminate as claimed in claim 8, wherein an adhesive (C) layer is placed between the low permeability resin composition (A) layer and the rubber composition (B) layer.

11. A pneumatic tire using a low permeability rubber laminate according to claim 8.

12. A pneumatic tire using a low permeability rubber laminate according to claim 8, as an inner liner.

13. A low permeability rubber laminate as claimed in claim 1, wherein a rubber ingredient in the rubber composition (B) is at least one member selected from diene-based rubbers, halogenated butyl rubbers, ethylene-propylene-diene copolymer rubbers and styrene-based elastomers.

14. A low permeability rubber laminate as claimed in claim 13, wherein an adhesive (C) layer is placed between the low permeability resin composition (A) layer and the rubber composition (B) layer.

15. A pneumatic tire using a low permeability rubber laminate according to claim 13.

16. A pneumatic tire using a low permeability rubber laminate according to claim 13, as an inner liner.

17. A low permeability rubber laminate as claimed in claim 1, wherein an adhesive (C) layer is placed between the low permeability resin composition (A) layer and the rubber composition (B) layer.

18. A pneumatic tire using a low permeability rubber laminate according to claim 17.

19. A pneumatic tire using a low permeability rubber laminate according to claim 1.

20. A pneumatic tire using a low permeability rubber laminate according to claim 1, as an inner liner.

* * * * *